United States Patent
Kurisu

(10) Patent No.: US 6,181,353 B1
(45) Date of Patent: Jan. 30, 2001

(54) ON-SCREEN DISPLAY DEVICE USING HORIZONTAL SCAN LINE MEMORIES

(76) Inventor: Motohiro Kurisu, 911-3-719 Imajuku, Chigasaki City, Kenagawa-Ken 253 (JP)

(*) Notice: Under 35 U.S.C. 154(b), the term of this patent shall be extended for 0 days.

(21) Appl. No.: 08/792,833

(22) Filed: Jan. 30, 1997

(30) Foreign Application Priority Data

Feb. 1, 1996 (JP) .................................... 8-037048

(51) Int. Cl.[7] .............................. G09G 5/00; G06F 13/00
(52) U.S. Cl. ..................... 345/511; 345/196; 345/197; 345/202; 345/203; 345/513; 345/508
(58) Field of Search ............................. 345/508–509, 345/513, 515–516, 196–197, 202–203

(56) References Cited

U.S. PATENT DOCUMENTS

| | | | |
|---|---|---|---|
| 4,367,466 | * 1/1983 | Takeda et al. | 340/725 |
| 4,398,189 | * 8/1983 | Pasierb, Jr. et al. | 340/721 |
| 4,435,779 | * 3/1984 | Mayer et al. | 345/203 |
| 5,404,437 | * 4/1995 | Nguyen | 395/152 |
| 5,534,942 | * 7/1996 | Beyers, Jr. et al. | 348/569 |
| 5,587,726 | * 12/1996 | Moffat | 345/201 |
| 5,640,502 | * 6/1997 | Knox et al. | 345/185 |
| 5,666,520 | * 9/1997 | Fujita et al. | 345/513 |
| 5,717,904 | * 2/1998 | Ehlers et al. | 395/511 |
| 5,821,947 | * 10/1998 | Nguyen | 345/202 |

* cited by examiner

*Primary Examiner*—Richard A. Hjerpe
*Assistant Examiner*—Duc Dinh
(74) *Attorney, Agent, or Firm*—Cantor Colburn LLP

(57) ABSTRACT

An on-screen display system using scan line memories. Complex on-screen display, comprising multiple layers of on-screen display, is achieved using a pixel memory having a maximum capacity of two horizontal lines of display data. Compressed display data (e.g. character, icon, etc.) is read from RAM and expanded into pixel registers. Pixel data from the pixel registers is forwarded to pixel memory for on-screen display. The pixel memory is also written back into one of the pixel registers and the pixel registers are overlaid to form complex on-screen display data.

27 Claims, 13 Drawing Sheets

0000 = TRANSPARENT
0001 = BLACK LEVEL
0010 - 1111 = PALETTE COLOR

COMPRESSED DATA FORMAT IN DISPLAY RAM

CHARACTER AND BUTTON DISPLAY FORMAT (MIDDLE LAYER) — 1902

| PAGE CONTROL WORD |
|---|
| 1ST ROW CONTROL WORD |
| ATTRIBUTE+CHARACTER |
| ATTRIBUTE+CHARACTER |
| ATTRIBUTE+CHARACTER |
| ATTRIBUTE+CHARACTER |
| BUTTON CONTROL WORD |
| BUTTON CONTROL WORD |
| BUTTON CONTROL WORD |
| BUTTON CONTROL WORD |

| 2ND ROW CONTROL WORD |
|---|
| ATTRIBUTE+CHARACTER |
| ATTRIBUTE+CHARACTER |
| ATTRIBUTE+CHARACTER |
| ATTRIBUTE+CHARACTER |
| BUTTON CONTROL WORD |
| BUTTON CONTROL WORD |
| BUTTON CONTROL WORD |
| BUTTON CONTROL WORD |

HALF-TONE DISPLAY FORMAT (BOTTOM LAYER) — 1901

| HALF-TONE CONTROL WORD |
|---|
| START POSITION (X1, Y1) |
| END POSITION (X1, Y1) |
| START POSITION (X2, Y2) |
| END POSITION (X2, Y2) |

CURSOR DISPLAY FORMAT (TOP LAYER) — 1903

| CURSOR CONTROL WORD |
|---|
| CURSOR START POSITION |

FIG. 19

ON-SCREEN DISPLAY DEVICE USING HORIZONTAL SCAN LINE MEMORIES

BACKGROUND

1. Field of the Invention

The invention relates in general to on-screen display (OSD) and in particular to a device that performs complex, overlaying of characters, graphics, etc. utilizing a small-scale display scan memory.

2. Prior Art

Conventional OSD devices have generally been designed to first store in display memory simple object characters, their colors and other very basic attributes. These OSD devices then read the display data from the display memory, according to incoming horizontal and vertical synchronizing pulses, retrieve corresponding font data from a character generator ROM and finally display the characters with the specified colors and other attributes. These steps require specialized hardware OSD circuitry.

A more recent architecture is based on a bit map display system, where complex OSD is made possible by allocating each pixel multiple bits in a large-scale, external, video display memory, that is controlled by a dedicated, graphics controller integrated circuit.

The extensive use of hardware circuitry in the conventional OSD devices has not only inherently limited their complex OSD capabilities, but have made them much less flexible, requiring extensive redesigning every time improvements are called for. The bit map display system, while allowing complex OSD, make their host products costly because they require a large-scale, external memory and a dedicated integrated circuit for fast display data generation.

SUMMARY OF THE INVENTION

The present invention uses a hybrid OSD device architecture to meet complex on-screen display needs more flexibly than the conventional, dedicated OSD hardware. The present invention uses high speed, dynamic pixel generation circuitry, built around a microprocessor and software to eliminate the need for large-scale display memory. This reduction in memory results in a substantially lower cost than bit map display system.

To achieve complex OSD, the invention uses a two scan line display memory as a pixel memory. The memory devices each hold data representing one horizontal scan line. This small-scale memory is combined with the following components:

a) A RAM memory space holding compressed, hierarchically-structured and multiple-type display data;

b) A ROM memory space holding character fonts, graphics icon data and dynamic pixel generation software;

c) A dedicated, high speed, dynamic pixel generation circuit;

d) color palette registers;

e) on-screen display circuits; and f) either a microprocessor or a sequence circuit with equivalent computational capabilities.

The major components of the invention will be briefly described. The display pixel memory holds pixel data for two horizontal scan lines. A data block represents sixteen (16) pixels, each pixel being allocated four (4) bits. A sixteen pixel array (64 bits) is manipulated in a single cycle. If the horizontal resolution is 640 pixels, the total capacity of the display pixel memory is 2×4×640 bits (2 lines, 4 bits per pixel, 640 pixels per line).

The compressed, multiple-typed, display data in the RAM memory space includes:

a) character display data including attributes and character data;

b) icon display data (icon number);

c) button display data (display frame type and coordinates) for buttons that may be selected by a user through a graphical user interface;

d) cursor display data (cursor type and coordinates);

e) half-tone display data (coordinates for partial-brightness display).

The ROM memory device keeps the following data:

a) character font pattern;

b) graphics icon data (definitions of all pixels in the individual icon, using 4 bits for each pixel);

c) dynamic pixel generation control software.

In the example provided below, fonts are sixteen (16) pixels wide and either eight (8), sixteen (16), or thirty-two (32) pixels tall. If the font is ten (10) or twenty (20) pixels tall, the excess data exceeding the integral power of two (e.g. 8 or 16) is separately defined, to minimize the pixel data block. For example, ten words of pixel data are separated into eight words and two words of data because the character font can be placed in any location of the memory, so eight words of data are placed in one memory area and the remaining two words are placed in another area. The graphics icons use four 16 bit-words for a single scan line and may be eight, sixteen or thirty-two pixels tall, similar to the character font. As described with respect to the character font, excess bits may be stored in a separate area.

The dedicated, high speed, dynamic display generation circuit consists of two modules. One module is the font address/attribute data separation circuit, which separates the character data from the attribute data. The font address/attribute data separation circuit also calculates the character font address from the separated character data and an offset address stored in an offset address register to determine the address of the character font in the ROM memory. The other module is a dynamic pixel generation circuit which generates pixel data in a single clock cycle based on the separated attribute data and the character data read from the ROM memory.

The font address/attribute data separation circuit includes:

a) a scan line register to point to the current relative scan line position within a font;

b) an AND circuit and a shifter circuit for extracting character data;

c) an offset address register for holding the starting memory address of the character data;

d) a compressed display data register for loading the compressed character display data;

e) two attribute registers for holding color and some attributes; and f) a font address register.

The dynamic pixel generation circuit includes:

a) a pair of character font registers;

b) a right/left fringe and immediate value generation circuit;

c) a right barrel shifter and smoothing circuits;

d) a pair of mixer registers;

e) a pair of 4×16-bit pixel registers;

f) a pixel mode register for specifying a pixel generation mode; and g) a pixel generation command decoder circuit.

There are fourteen color palette registers, each of which holds six bits: two each for the red, the green and the blue component of RGB. Each pixel is represented by a four bit color data. If the four-bit pixel data is all zeros (0000), a transparent pixel is "displayed", resulting effectively in no overwriting of the background for that pixel position. If set to (0001), the pixel color is black. The remaining 14 four bit combinations (0010–1111) are used to access one of the color palette registers. The display circuits include a dot clock counter, circuits to control the display start position and the maximum display width, and timing signal generation circuits for the OSD display. A microprocessor or a sequence circuit implements the display software and transfers the sixteen bits of data to each module.

Two horizontal scans of display pixel memory have a particular role respectively in a single horizontal period. One of the pixel memories is used to display the complex pixel pattern on the display device and the other pixel memory holds newly generated display data. The process is repeatedly implemented at the input of the horizontal sync signal and is continued through the vertical region. By using this technique, and without having a large scale display memory, the complex OSD display process is carried out in real time by following the horizontal sync signal.

The RAM in the microprocessor maintains multi-layer structured display data which are compressed in several different formats. The compressed data is expanded in order and the expanded pixel data is stored into pixel memory. The newly generated pixel data is held in a first pixel register group and another pixel register group holds the previously generated pixel data read from the pixel memory. The contents of the two pixel register groups are overlaid and the result is stored into pixel memory. Thus, the complex OSD is processed by overlaying newly expanded display data layer by layer.

The compressed display data, including character data and the attribute data, is provided to the font address / attribute data separation circuit and the current attribute data is separated to attribute register A. At the same time, the previous attribute register A is pushed onto attribute register B. Also, the character font address is generated by the shifted character data with the current scan line data specifying the location of the font. Then the font data is read from the ROM to the font register. Finally, a pixel generation command is issued to a pixel array generator which utilizes the font data and a pair of attribute data to generate the character pixel data. Sixteen pixels generated in a single cycle are transferred to the pixel memory. Accordingly, multiple pixels are manipulated in a single cycle.

This invention enables complex OSD similar to a bit map memory system by utilizing flexible software techniques for combining scan line memories, a display circuit, high speed pixel generation circuits and a microprocessor. Multi-layer OSD can be achieved by using a single cycle pixel overlay circuit in real time with pixels being expanded out of compressed display data defined in different formats. New OSD functional upgrades can be easily accommodated by updating the software driver. If it becomes difficult to improve the display quality by altering the software, it is easy to redesign the system by changing a portion of pixel generation circuit because the OSD functions are implemented separately in each functional block. The number of character font, total number of graphics icons and the size of the multi-structured compressed display data can be defined by software so that memory such as ROM and RAM in the CPU is not wasted. On the other hand, an ordinal CPU can handle real time OSD by properly utilizing the single cycle font address/attribute data separation circuit and the single cycle pixel generation circuit. In addition, the OSD system requires only two scan lines of display memory thereby significantly reducing the system cost.

BRIEF DESCRIPTION OF THE DRAWINGS

FIG. 19 illustrates three different types of display format.

DETAILED DESCRIPTION OF THE INVENTION

Figure 1:
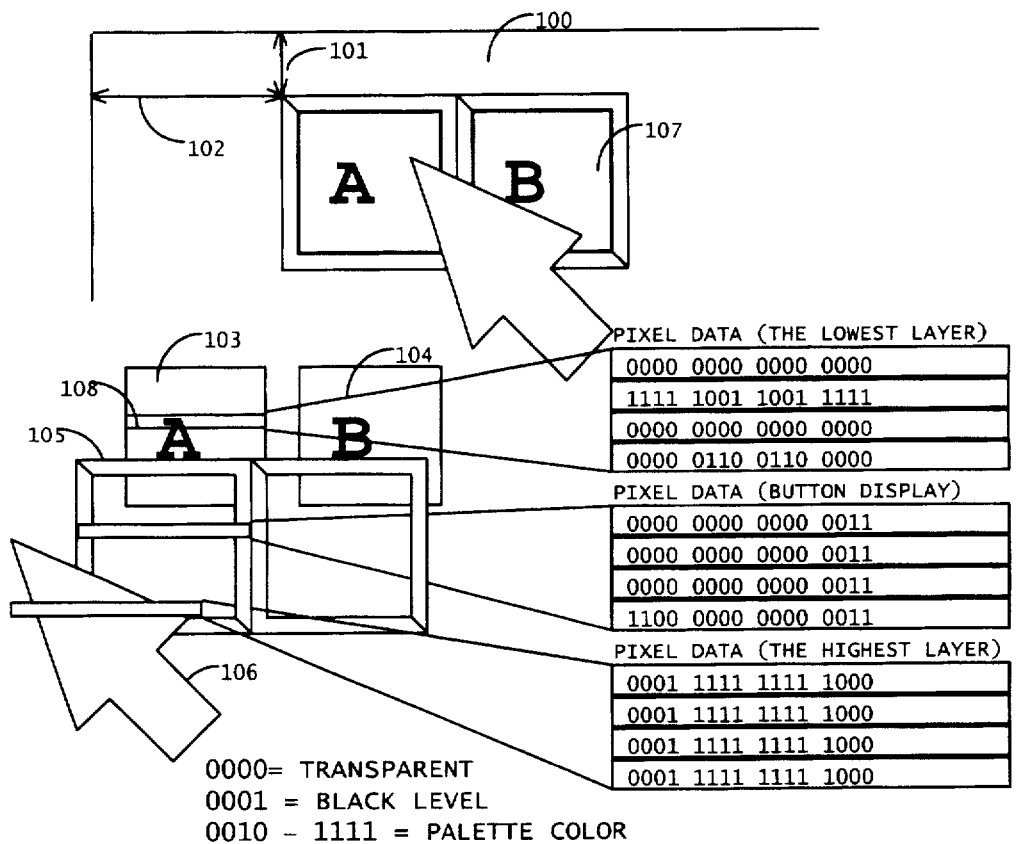
FIG. 1 is an example of a three layer OSD.

FIG. 1 is an example of an on-screen display including three layers of complex patterns. The pixel values of a portion of each pattern are shown in the right hand side of FIG. 1. The vertical display position 101 of the button display 105 is determined by counting the number of the interrupt requests from the horizontal scan signals. The horizontal display position 102 is detected by hardware circuits which count the dot or pixel clock (e.g. the minimum unit of a character font). In this example, the bottom layer of character font has two colors, a foreground color 103 and a background color 104. Each pixel is represented by four bits and sixteen pixels are manipulated at once. Four sixteen bit words of data are provided to Pixel Memory 0 701 to Pixel Memory 3 716. A pixel having a display data of "0000" means a transparent display on the screen, i.e., no display. Pixel display data of "0001", is black, that is, the lowest RGB level output. The remaining four bit combinations (0010–1111) of pixel display data selects one of the 14 color palettes consisting of six bits for RGB colors. Pixel display data "1111" is assigned to white as shown in the example illustrated in FIG. 1. The button display 105 on the middle layer is structured by both white at the top and right, and black at the bottom and left. The cursor display 106 on the top layer is white.

Figure 2:
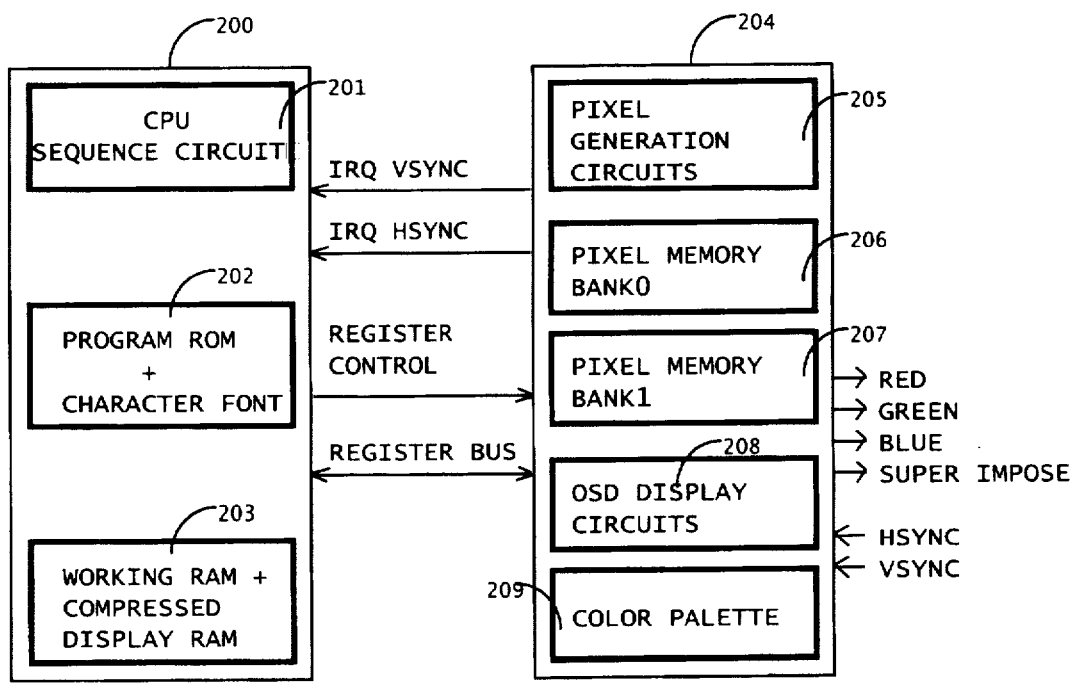
FIG. 2 is a block diagram of the overall OSD system.

FIG. 2 is a block diagram of the overall OSD system. The major system components are a microprocessor 200 and an OSD unit 204. The microprocessor includes CPU 201, program ROM 202 and RAM 203. The character font and icon data are stored in the program ROM and the plurality of compressed display data are stored in the RAM. The OSD unit includes pixel generator circuits 205, two banks of pixel memory 206 and 207, fourteen color palettes 209 and OSD display circuits 208 which display the pixel memory data on the screen at the proper horizontal timing.

The pixel generator circuits 205 implement a) address generation of character font in ROM, b) single cycle of pixel generation, c) pixel overlay, d) pixel shift operations and e) data transfer between the pixel registers and pixel memory. Two banks of pixel memory are used for two horizontal lines of pixel display. The OSD block and microprocessor are connected by a sixteen bit register bus with address bus, read and write control signals and two interrupt inputs. HSYNC (horizontal sync signal) and VSYNC (vertical sync signal) are properly modified with the appropriate polarity and are fed into the microprocessor as the interrupts.

Figure 3:
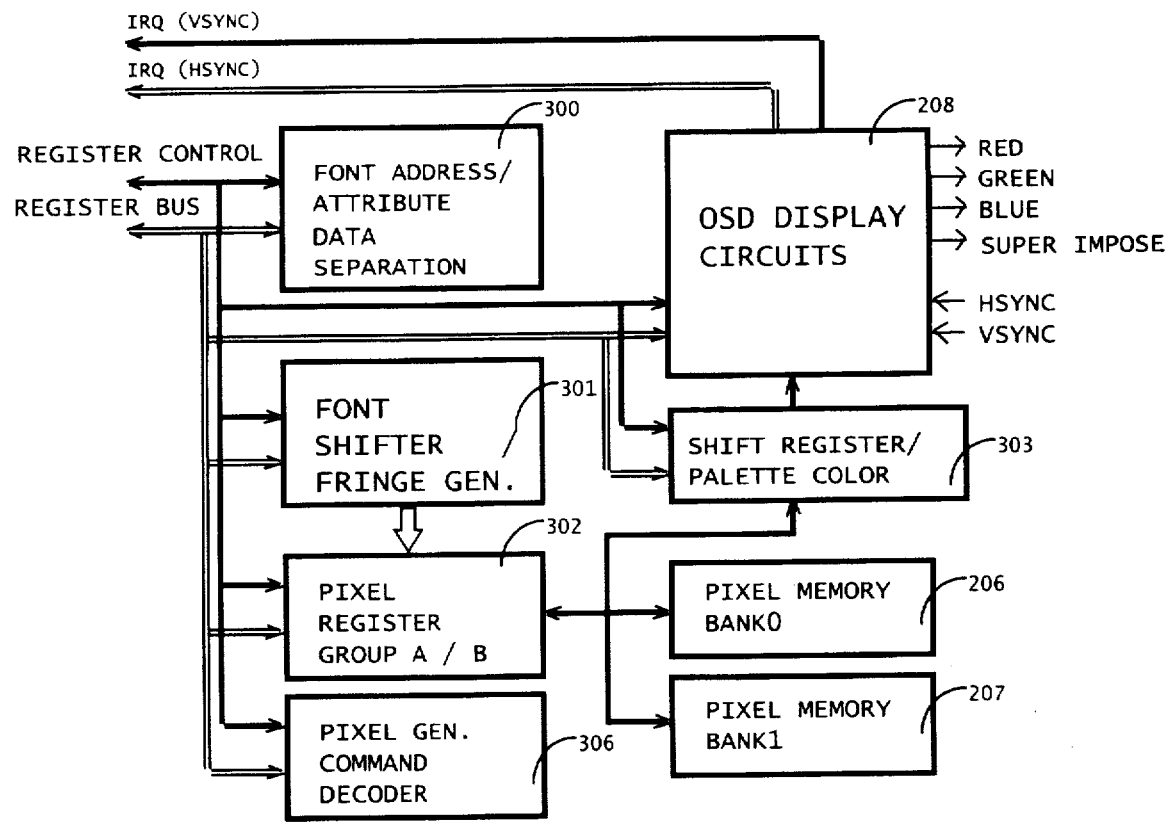
FIG. 3 is a block diagram of the OSD logic unit.

FIG. 3 is a block diagram of the OSD logic unit. The font address/attribute data separation circuits 300 separates the font address, which identifies a ROM location assigned as the font area, and attribute data when the compressed sixteen bits of display data, including the character font and color attribute, are written to a compressed display data register 409. A font shifter/fringe generator 301 handles fringe processing for the character pattern and also performs barrel shifting of the font pattern. Two groups of pixel registers are used for pixel overlay. The shifted font and the fringe data are matrix-crossed with color information specified by two attribute registers. The manipulation result is transferred into the pixel registers in a single cycle. The pixel generation command decoder 306, whose mode is specified by the pixel mode register 1601, controls blocks of 301, 302, 206 and 207 when a sixteen bit pixel generation command is issued into the pixel generation command register 1602. Pixel memory banks 206 and 207 each consists of 160 sixteen bit words (for a 640 pixel horizontal display) for a total of 320 words. One of the two banks of the pixel memory is used for displaying pixels, while pixel data is generated into the other bank. The role of each pixel memory bank is switched alternately as the horizontal sync signal is detected. The OSD display circuit 208 sends the display timing signals to one of the pixel memories and directs four words of pixel data to the shift register/palette color circuits 303. The four words of pixel data are latched into the shift registers 303 and four shifted bits selects one of the palette registers at the rate of the dot (or pixel) clock. If the four bits are either "0000" or "0001", the palette register is not accessed. Rather, when the data is "0000", the RGB and super impose signals are turned off to create a "transparent" overlay. If the pixel data is "0001", black is displayed by setting RGB output to the lowest level and setting the super impose signal to a high level. By assigning one of the pixel data ("0000") to transparent, or no overlay, the system does not require additional memory units for storing super impose control data. The remaining fourteen pixel data combinations (0010–1111) select one of fourteen color palettes, each containing six bits made up of 2 bits for red, 2 bits for green and 2 bits for blue.

Figure 4:
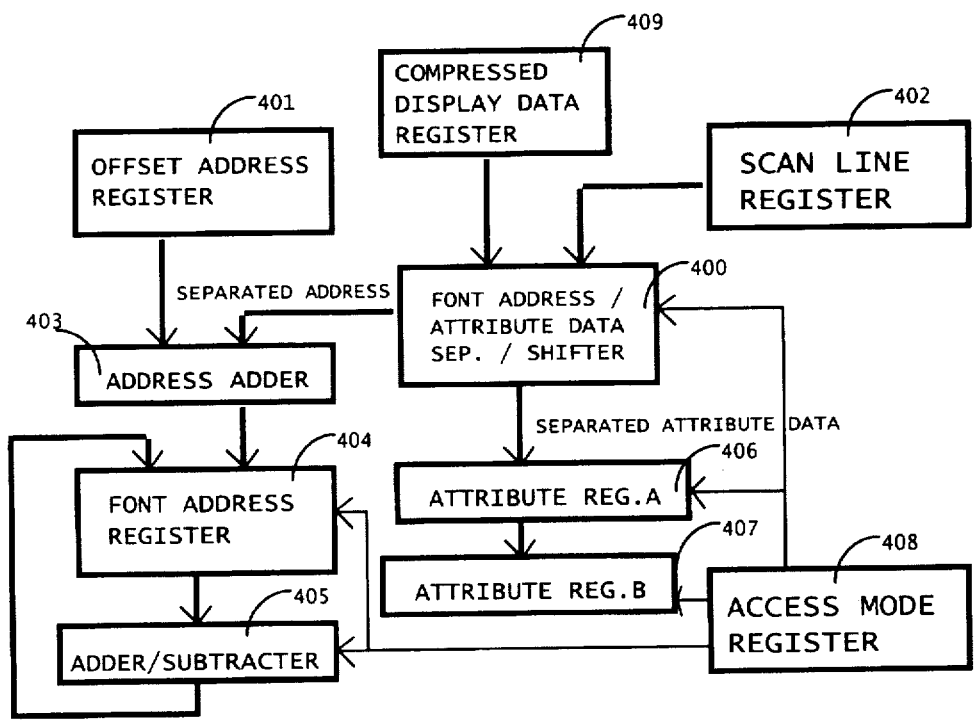
FIG. 4 is a block diagram illustrating the font address/ attribute data separation circuit.

FIG. 4 is a block diagram of the font address/attribute data separation circuits 300. When compressed data including attribute data and character data is written to the compressed display data register 409, the attribute data and character data are separated respectively to the attribute register A 406 and the font address register 404.

The separated character data is first synthesized with scan line register 402, then the result is added to offset address register 401. As described above, the scan line register points to the current relative scan line position within a font. The valid bit width for a scan line and the maximum character kind are specified in the access mode register 408. The attribute data is assigned at the upper portion of sixteen bits and the character data is placed in the lower portion as shown in FIG. 17c. If the number of characters is increased (requiring more than bits 0–6 shown in FIG. 17c), the attribute data cannot be contained in the same word as the character data. In this situation, the attribute data and character data may be defined in two words separately. In this situation, the attribute data should not be extracted in the font address/attribute data separation circuit because the character data and attribute data are already in separate words. To accommodate this situation, one bit can be designated a control bit for no attribute separation and stored in the access mode register 408.

When the compressed display data is written to the designated register, only the character portion is first separated by font address/attribute data separation/shifter circuit 400. Then the character data is shifted to the left with the valid width of scan line register 402 specified in access mode register 408. If the current font in vertical direction is eight dots long, the three bits of Scan Line Register is valid and as a consequence, the character data is shifted three bits left. Four bits shift for sixteen dots length and five bits shift is accommodated for thirty-two dots length. The shifted character data and the scan line register value are combined in a single word by placing the scan line register value at an end of the character data.

In multi-color icon display, each pixel has its own color as opposed to a single foreground color and a single background color. For multi-color icon display, the system accesses four words of pixel data rather than a word of character font. The particular multi-color icon should be numbered similar to the character font access. Accordingly, the result of synthesized icon data and scan line register data is further shifted two bits left. The separated address and offset address register 401 are added by address adder 403 and the result is loaded into the font address register 404. The offset address register 401 can be used in two ways. First, the offset address register can define the character and icon fonts in any position of program ROM by using an offset value to locate the character or font data in the ROM. Second, the offset address register defines where any fragment portion of a character or icon, which exceeds an integral of two's power, is stored. The excess portion of the fonts exceeding the predetermined font heights (e.g. bottom two pixels for a ten pixel high font or the bottom four pixels of a twenty pixel high font) are collected in one area of the ROM so as to not waste memory space between character fonts. Thus, the two groups of font data are properly accessed by changing the offset address value.

The adder/subtracter 405 increments or decrements the font address when the CPU reads an address from the font address register. The modes of increment address, decrement address, and no action are stored in the access mode register 408. This feature is useful when accessing a block of data for fetching graphics icon data or accessing a previous or subsequent character font for fringe processing or smoothing processing.

The attribute portion is stored in attribute register A after the non-attribute data has been separated. The previous value in attribute register A is then transferred to attribute register B at the same time. The same kind of operation, i.e. register pushing, occurs when sixteen-bits of data is written to attribute register A through normal register access. Thus, the current attribute is held in the attribute register A and the previous attribute is held in attribute register B. The previous attribute is used to specify the attribute color for the left portion of a font when the character font is shifted. The shift operation is described below with reference to FIG. 11.

Figure 5:
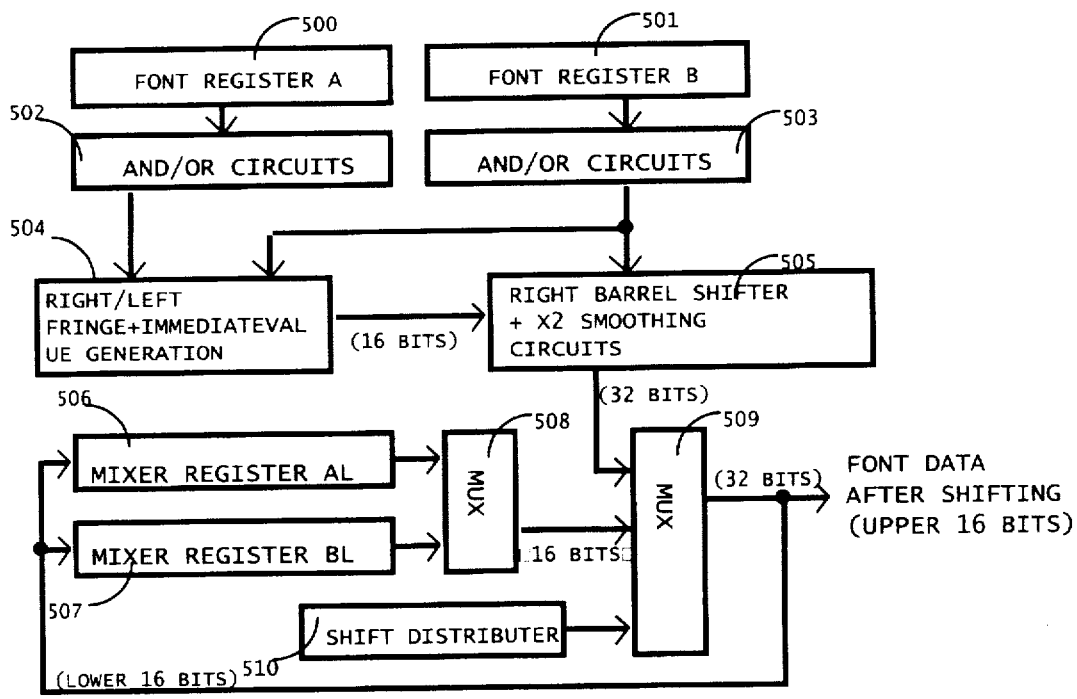
FIG. 5 is a block diagram illustrating the font shifter/ fringe generation circuit.

FIG. 5 illustrates the font shifter/fringe generator 301 in detail. Font register A 500 holds current font data defined in program ROM and font register B 501 maintains the font for one scan line before (or after) the current font data for fringe processing and size doubling/smoothing processing. AND/OR circuits 502 and 503 are used to blink the character or to overlay an underline prior to pixel generation. The right/left fringe+immediate value generation circuits 504 implement the left side fringe processing, right side fringe processing and both direction fringe processing, as well as immediate data generation of "AAAA" and "5555" hex half tone patterns. It also includes a data inversion function for the font data when the pixel generation command is issued. Right barrel shifter and smoothing circuits 505 execute a right shift or font size doubling/smoothing for font data A and B. The right shift operation is used to create italic font by incrementally shifting portions of the font to the right. Right barrel shifter+×2 smoothing circuits 505 generate a thirty-two bit output.

Figures 11, 12:
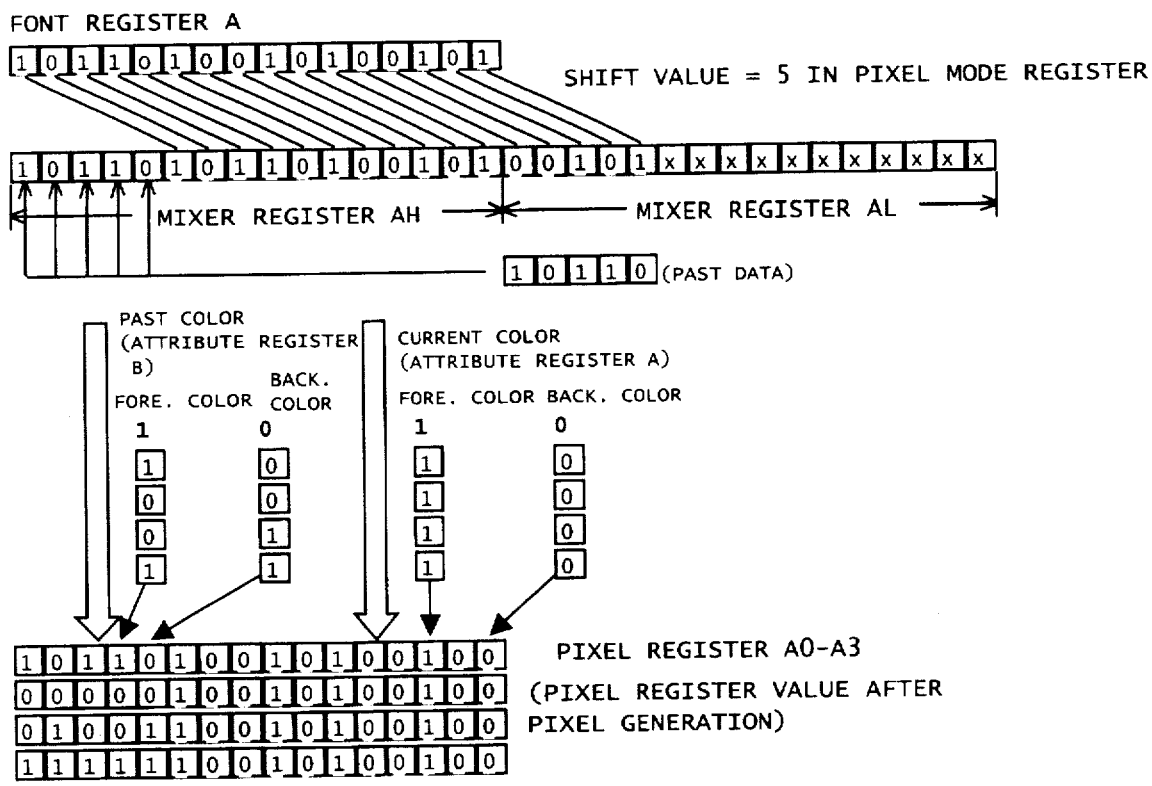
FIG. 11 illustrates the pixel register content during a single cycle pixel generation including a shift operation.
FIG. 12 illustrates a pixel overlay operation between Pixel Registers A0–A3 and Pixel Registers B0–B3.

Mixer Register AL 506 temporarily stores the lower sixteen bits of the current font data after the shift operation as shown in FIG. 11. Mixer Register BL 507 stores the lower sixteen bits of previous font data for fringe processing. These two sixteen bit registers are selected by multiplexer 508 and are combined by multiplexer 509 to provide the upper 16 bits of font data as shown in FIG. 11. The ratio of bits taken from the current and previous font data is specified by shift distributor 510 derived from a four bit shift value stored in pixel mode register 1601(shown in FIG. 16). The value in the shift value stored in the pixel mode register is modified so that an appropriate italic character is generated. Thus, the shift value at the top of the character is greater than the shift value at the bottom of the character. The multiplexer 509 combines both the current and previous font data. The lower bits exceeding the upper sixteen bits are re-stored to either mixer register AL or BL and the upper sixteen bits are stored to mixer registers AH, BH and pixel registers along with color attribute data as described below with reference to FIG. 6.

Figure 6:
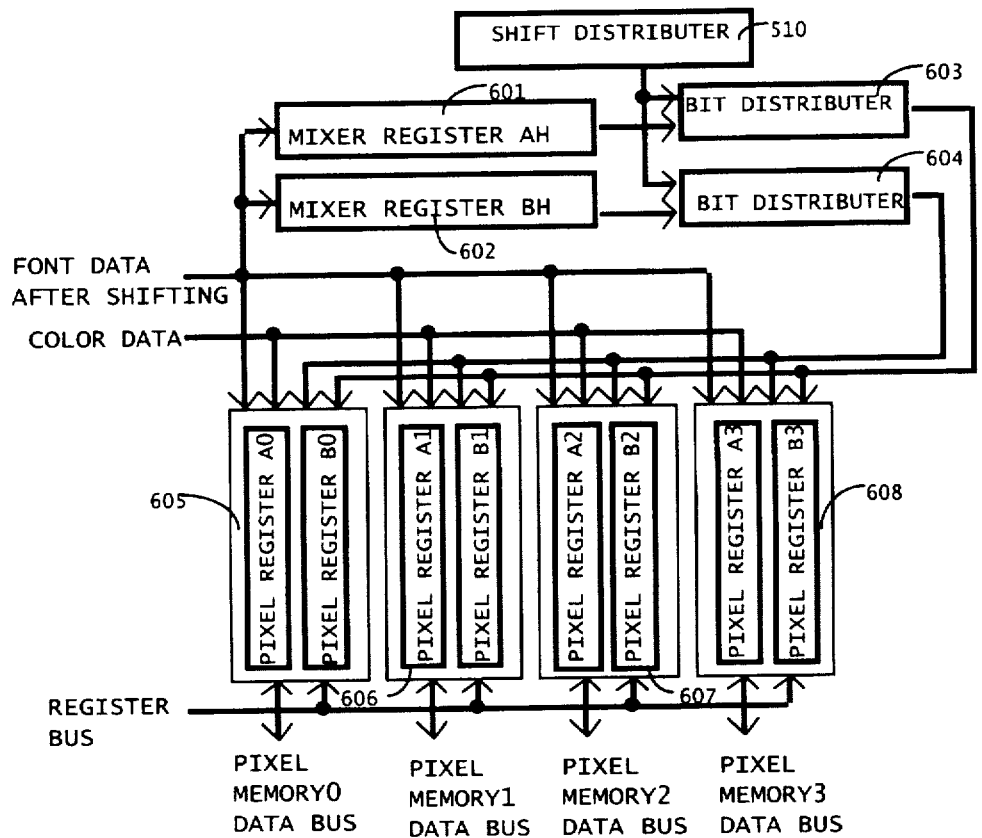
FIG. 6 is a block diagram of the interaction between pixel registers A, B and mixer registers AH and BH.
Figure 10:
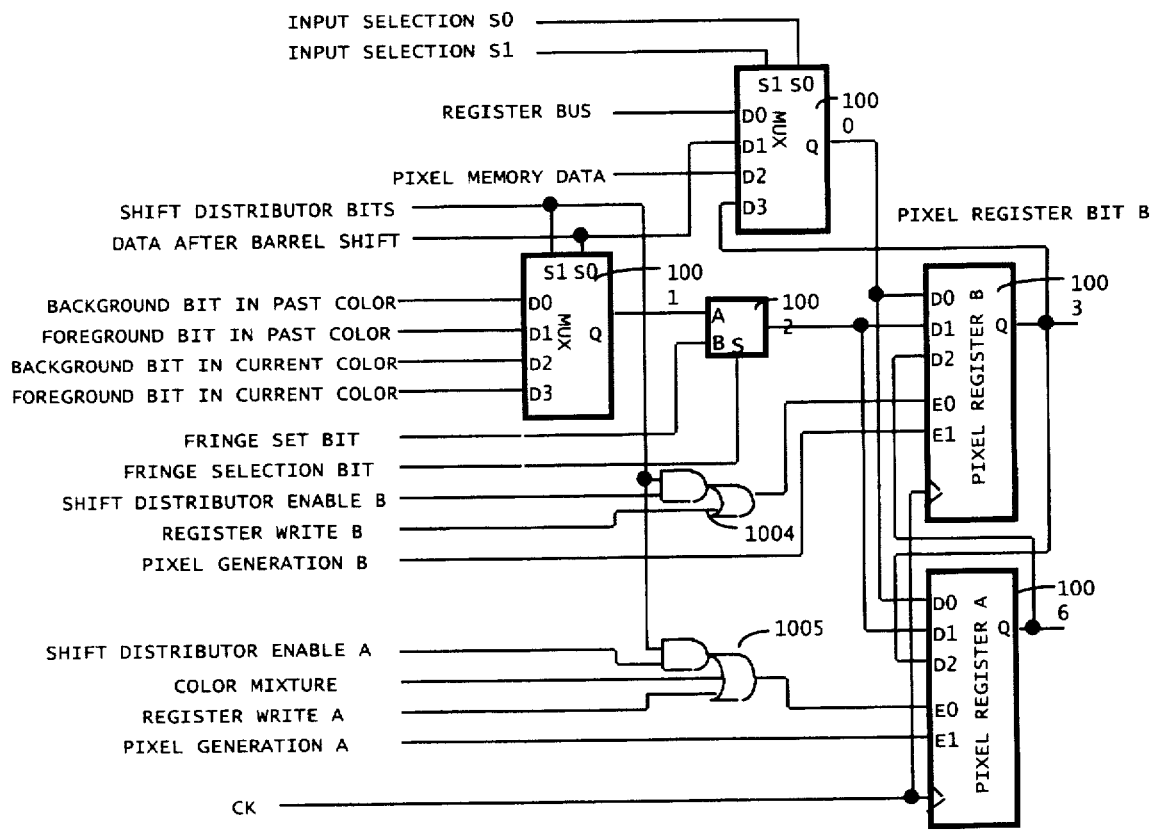
FIG. 10 is a block diagram of pixel register bits A and B and associated circuity.

FIG. 6 is a block diagram of pixel registers A, B identified as 605–608 and mixer register AH 601, mixer register BH 602 and associated circuitry. The pixel registers A and B are loaded in a single cycle from shifted font data and color data after a pixel generation command is issued. The minimum unit of a pixel register circuit (e.g. one bit storage) is shown in FIG. 10 and includes a multiplexers 1000, 1001 and 1002 and pixel register bit A 1003 and B 1004 with the associated logic circuits. The color data in FIG. 6 includes data of past background color, past foreground color, current background color and current foreground color as shown in FIG. 10. The font data including the current and previous display pattern selects either a foreground or background color out of the current and previous color attributes. Mixer register AH 601 and shift distributor 510 are used to perform a pixel overlay between pixel registers A and B. The overlay is performed when the word provided by bit distributor 603 is a "1". In case of fringe synthesis, mixer register BH 602 and shift distributor 510 are ANDed with bit distributor 604 to generate fringe pixels in the pixel registers. Each pixel register can be read from or written to via the register bus.

Figure 7:
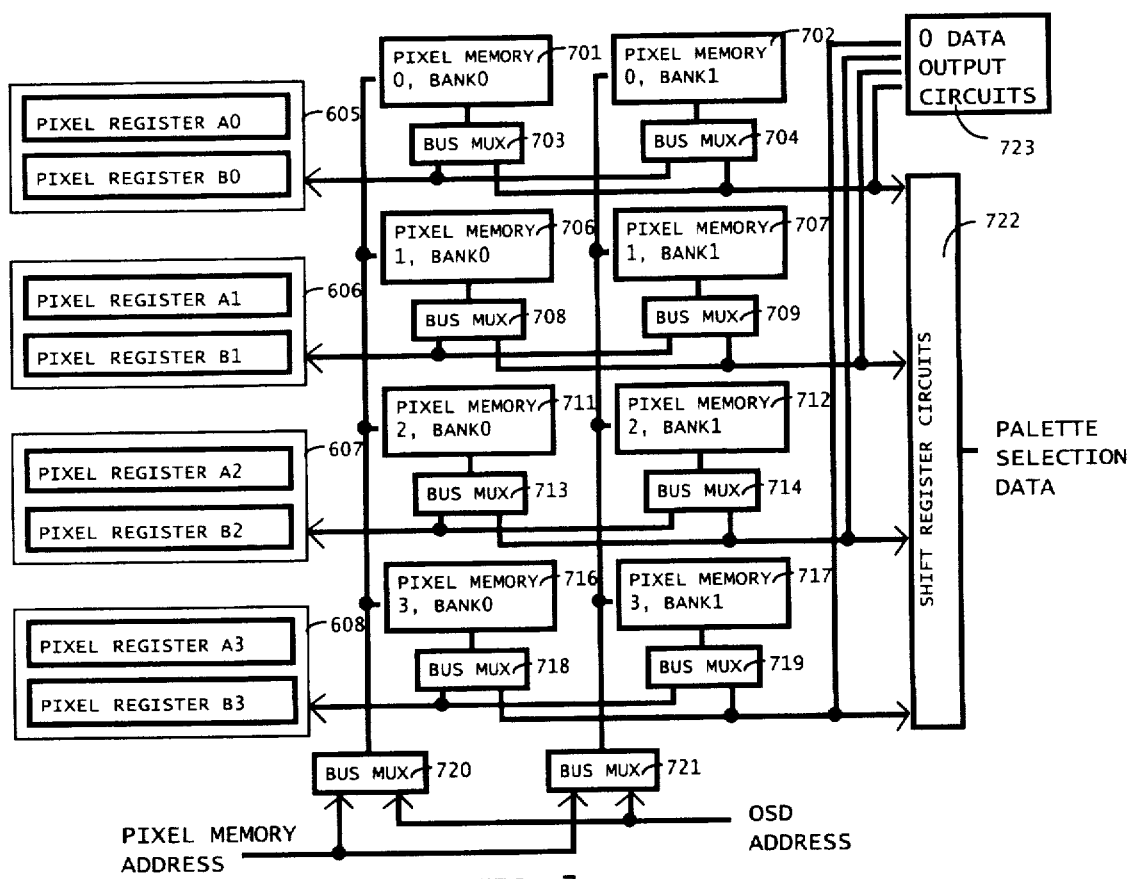
FIG. 7 is a block diagram of the pixel registers and pixel memories.

FIG. 7 illustrates the relationship between pixel registers and the pixel memories. The operation of pixel registers A0 and B0 is identical to pixel registers A1–A3 and B1–B3. Address bus multiplexers 720 and 721 select either a register address or an OSD address when the pixel memory is accessed. If a pixel memory bank selection bit is zero in the pixel mode register 1601, the register address is connected to pixel memory bank 0 (pixel register data is loaded into pixel memory bank 0) and the OSD address is connected to pixel memory bank 1 (display data is retrieved from pixel memory bank 1). The OSD address is generated by OSD display circuits 208 and is updated at display timing. If the pixel memory bank selection bit is one, then the register address is connected to pixel memory bank 1 and the OSD address is connected to pixel memory bank 0. Data bus multiplexers 703 and 704 work in a similar manner to couple the pixel memory banks to the pixel registers or to the shift register circuits 722 as needed.

The data in pixel memory which is accessed by an OSD address is stored into shift register circuits 722 at the proper display timing and subsequently the pixel memory content is reset to zero by "0" data output circuits 723 immediately after the pixel memory data is loaded into the shift register circuits 722. This reset operation eliminates wasting time for pixel memory initialization. The four bit output of the shift register circuits 722 selects one of the palette registers as a pixel color for display.

Figure 8:
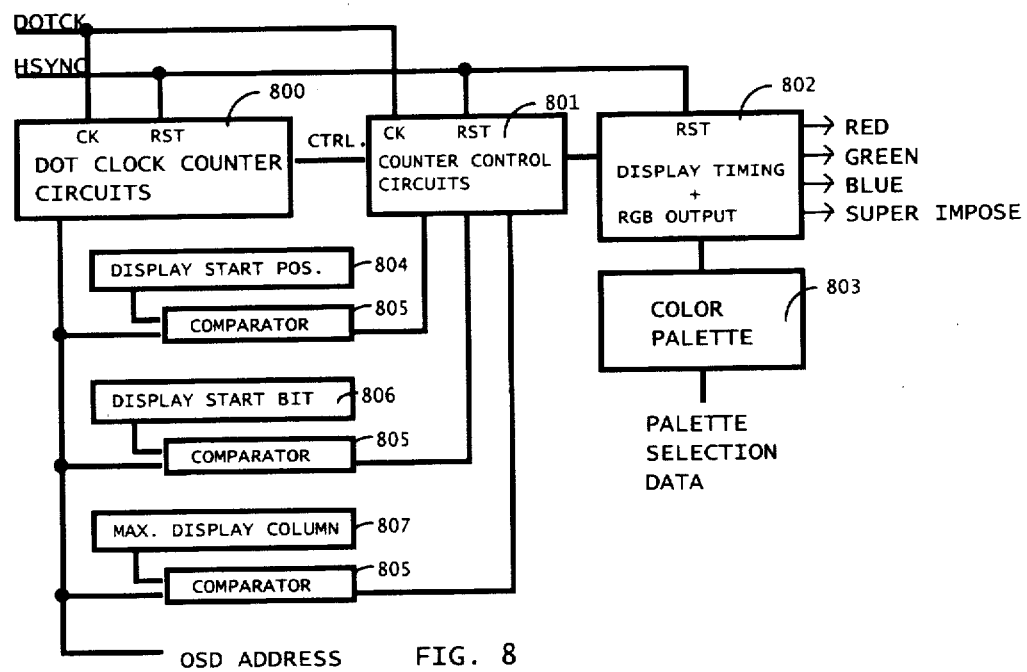
FIG. 8 is a block diagram of the OSD display circuits and color palettes.

FIG. 8 is a block diagram of the OSD display circuits and color palettes. A Horizontal sync signal, i.e. HSYNC, initializes the dot clock counter circuits 800, counter control circuits 801 and display timing+RGB output unit 802. The dot clock, DOTCK, is a synchronized signal for the incoming HSYNC pulse. After the input of horizontal sync signal, the dot clock counter is incremented by DOTCK. A flag is sent to the counter control circuits 801 when the value in dot clock counter is equal to a display start position 804. The comparison between the counter value and the start position is done by comparator 805. Then the OSD address "0" is set to pixel memory bank after the dot clock counter is reset. Four words of sixteen bits of pixel data are fetched from the pixel memory into the shift register circuits 722 after the sixteen dot clock pulses. The shifted four bits selects one of the color palettes 803 and generates output pixels through the display timing+RGB output circuits 802. The display start bit 806 identifies the pixel position in the beginning and the end of display column. If the display start bit is "0", then the display column spans from the first bit of a first character to a first bit of a subsequent character. When the display start bit is an intermediate value (e.g. 8), the display column spans form the 8th bit of a first character to the 8th bit of a subsequent character. The maximum display column 807 specifies the width of a valid display column. When the dot clock counter is identical to the maximum display column width 807, comparator 805 sends a flag to the counter control circuits 801 to shuts off the OSD display at the proper pixel position.

Figure 9:
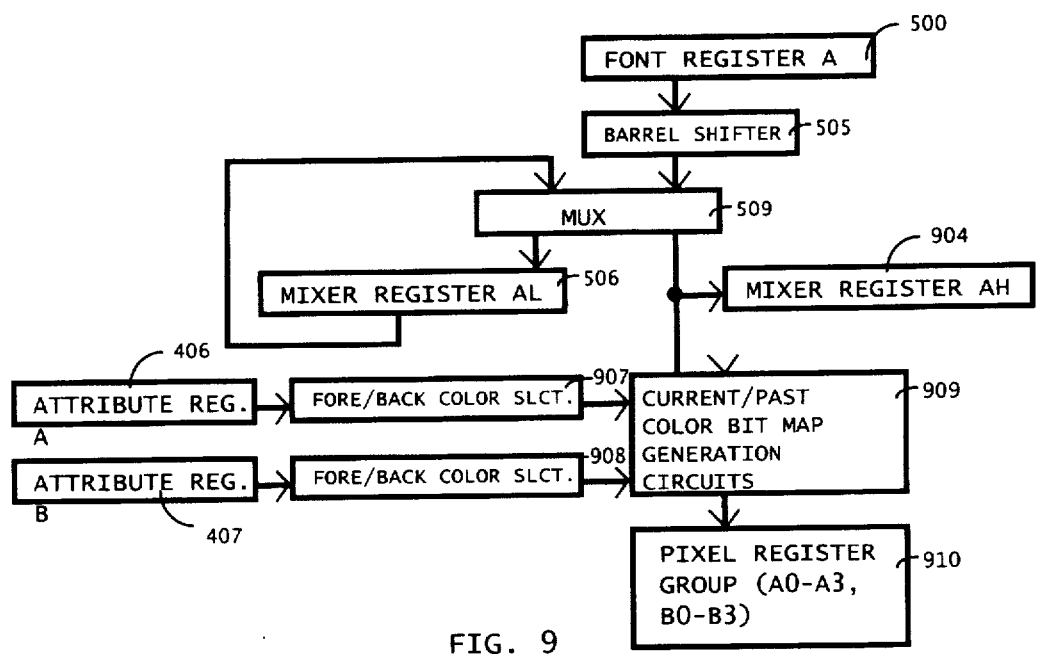
FIG. 9 is a functional flow chart of pixel generation when a pixel generation command is executed.

FIG. 9 is a functional diagram of the pixel generation process when a pixel generation command is executed. The pixel generation command carries out single cycle pixel data generation from the character font data and attribute data. In the functional diagram, the character font is held in font register A 500 and is shifted by barrel-shifter 505. The result is combined with mixer register AL 506 by multiplexer 509. The mixer register AL holds the past font data. The new shifted result is then stored back to mixer register AH 904 and AL. The attribute registers A 406 and B 407 store current and past foreground and background colors which are selected by the foreground/background color selectors 907 and 908. The current/past color bit map generation circuits 909 properly distributes one of the four kind of colors, including current foreground color, current background color, past foreground color and past background color, based on the ratio of past to current data. If the font data output by multiplexor 509 is a one, then the foreground color is selected. Otherwise, the background color is selected. A sixteen pixel array, each pixel having four bits, is stored into pixel registers A and B 910.

FIG. 10 illustrates the minimum unit of storage (e.g. one bit) in pixel registers A and B with the associated circuitry. The pixel register A 1003 and B 1006 are made from D-type flip-flops with three inputs and the current value is maintained while E1 and E0 strobe inputs are equal to 00 in binary format. The following combination describes the D-FF operation.

E1 E0 Q(D-FF)

0 0 Q (Keep current status)

0 1 D0 (Store D0 value)

1 0 D1 (Store D1 value)

1 1 D2 (Store D2 value)

The clock signal is a trigger input for either a pixel generation command or for accessing the flip-flop. The multiplexer 1000 selects one source of data from the I/O register bus, the pixel memory, the shifted font data or the pixel register B. The register bus input at multiplexer 1000 is a data bus for direct access of the pixel registers from the CPU. The pixel memory data bus is used for pixel memory reading and the pixel register B input is for pixel overlay of pixel register A. Valid data is provided on the shifted data bus when the pixel generation command is issued. When expanded font data is stored into either pixel register A or B, the control signals used include enabling register writing to pixel registers A and B, shift distributor bits and decoded signals from the pixel generation command such as a shift distributor enable A and B signals.

In case of a single cycle pixel data generation by font register A and attribute register A and B, multiplexer 1001 selects either past or current color data in response to the shift distributor bits and also selects either foreground or background color based on font data after the barrel shifting operation. When fringe processing is enabled, mixer register BH provides a fringe selection bit and the fringe bit, properly defined as pixel data 0001, is stored to the pixel register to represent a black pixel. The multiplexer 1002 is used to overlay the fringe data, i.e. black pixels, into the pixel register. To store the output of multiplexor 1001 and multiplexer 1002, pixel generation A and B strobes are applied to pixel register A and B.

When the content of pixel register B is overlaid into pixel register A, the contents of pixel register B 1003 are selected by multiplexer 1000 at input D3 and is stored back to the pixel register A 1006. The control signals used to perform the overlay operation are the content of mixer register AH, the decoded data of the pixel generation command, and the right/left mask data ANDed together. Then the result of the AND operation provides a color mixture signal at AND-OR circuit 1005. In this way, the appropriate pixels from pixel register B are selected and stored over the data in pixel register A.

The D2 inputs of pixel registers A and B are used to transfer pixel data between pixel registers A and B. The following operations may be performed.

1) Pixel Register A=Pixel Register B (load pixel register A into pixel register B).

2) Pixel Register B=Pixel Register A (load pixel register B into pixel register A).

3) Pixel Register A< >Pixel Register B (swap contents of pixel registers A and B).

FIG. 11 illustrates the generation of pixel register data in a single cycle including a shift operation. In this example, the shift value in the pixel mode register is five. FIG. 11 illustrates the generation of pixel data from font register A to pixel registers A0–A3. The contents of font register A are stored to mixer register AH after a five bit barrel-shift to the right. At the same time, the mixer register AL stores the five bits that were shifted out of mixer register AH. The five bits from mixer register BL, corresponding to past font data, are stored in mixer register AH. The shaded bits in FIG. 11 indicate the current manipulated font and the unshaded bits represent past manipulated font data. Attribute register A holds the current color data and attribute register B holds the past color data. If a bit in mixer register AH is one, then foreground color (either past or current depending on the bit location) is synthesized as pixel data in the pixel register. Otherwise, background color (either past or current depending on the bit location) is stored in the pixel register. As shown in FIG. 11, the pixel registers have a four bit depth and are filled in a single cycle in response to the pixel generation command.

FIG. 12 illustrates the pixel overlay operation in the right direction between pixel registers A0–A3 and pixel registers B0–B3. As described above, the shift value in this example is five bits. A right mask data is set to 07FF hex (00000111111111) so the bit data is "1" from bit position 10 to bit position 0. When the mask data bit and the mixer register AH bit are both "1", the pixel overlay is enabled. Thus, the shaded bits in mixer register AH correspond to shaded pixel data in pixel registers A0–A3 which is overlaid on the contents of pixel registers B0–B3. The left half of FIG. 12 indicates the contents of pixel registers A and B before the pixel overlay operation and the right half of FIG. 12 shows result of the overlay operation. The data at bit register positions 0, 3, 4, 7 and 10 in pixel register A is placed over the corresponding locations in pixel register B and this result is stored in pixel register A. The system provides three kinds of pixel overlay including the overlay in the right direction, overlay in the left direction and overlay in both directions.

Figure 13A:
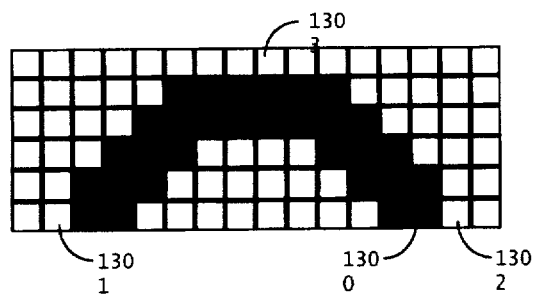
FIG. 13a illustrates the character fringe effect.
Figure 13B:
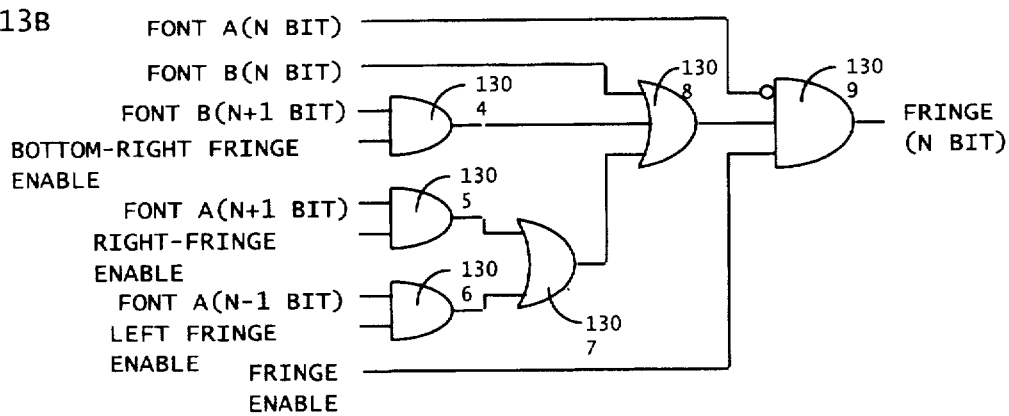
FIG. 13b is a schematic diagram of the circuitry for producing the fringe effect.

FIG. 13(*a*) illustrates the character fringe effect performed by fringe generator 504. FIG. 13(*b*) is a schematic diagram of the fringe generation circuitry. Pixel 1301 is a left fringe pixel, pixel 1302 is a right fringe pixel and pixel 1303 is an upper fringe pixel. FIG. 13(b) is an exemplary circuit showing one bit of fringe generation for all possible cases. The font A pixel, labeled Font A (N BIT), is the current pixel and the fringe circuit will not produce a fringe pixel if the current pixel (FONT A N BIT) is a "1". Font B identifies pixels either one scan line before or after against the current scan line. The pixel to the left of the current pixel is labeled FONT A N+1 BIT and the AND circuit 1305 is for right fringe generation if right fringe generation is enabled. The pixel to the right of the current pixel is labeled FONT A N−1 BIT and the AND circuit 1306 is for left fringe generation if left fringe generation is enabled. The AND circuit 1304 is for bottom-right fringe generation based on the status of the pixel below and to the left of the current pixel (FONT B N+1 BIT). All of the fringe data are ORed by OR circuits 1307 and 1308. Accordingly, if the fringe operation is enabled and the current font data (FONT A N BIT) is zero, the fringe bit becomes one. Other fringe bits for upper, lower etc. are similarly produced.

Figure 14A:
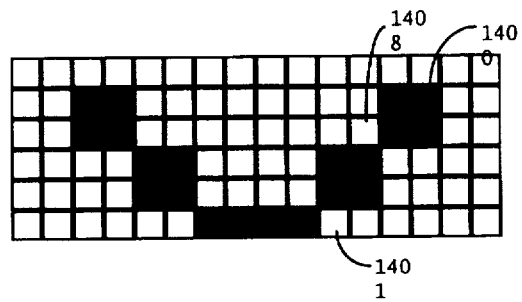
FIG. 14a illustrates character smoothing.
Figure 14B:
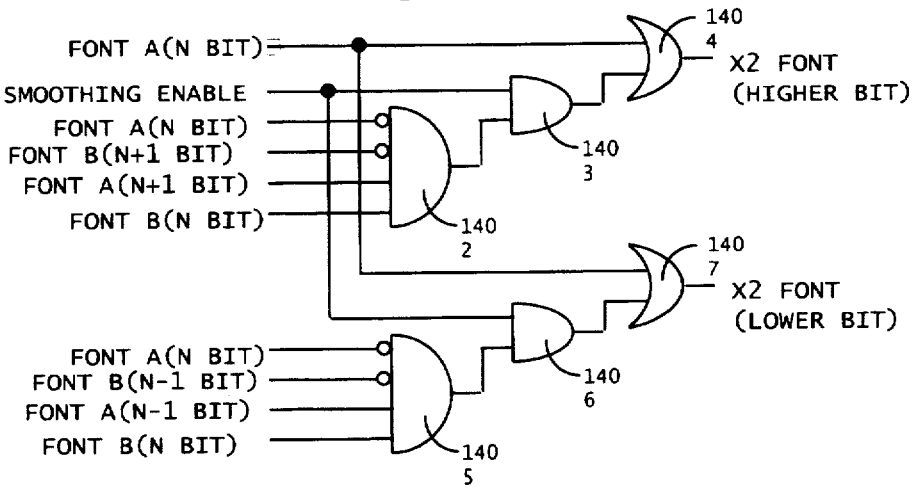
FIG. 14b is a schematic diagram of the character smoothing circuit.

FIG. 14*a* illustrates character smoothing/size doubling process and FIG. 14*b* is a schematic diagram of the circuit for performing the smoothing/doubling. The circuit expands each pixel to two pixels and inserts smoothing pixels where necessary. In FIG. 14*a*, 1400 represents on original pixels. Pixels 1401 and 1408 are smoothing pixels added by the smoothing circuit. Font A means the current display font and Font B means the display font either one scan line before or after the current scan line. The N bit position is the current pixel position and N+1 bit position means the pixel to the left of the current pixel and N−1 bit position means the pixel to the right of the current pixel. If font A is one, the pixel is expanded into two "1" pixels by OR circuits 1404 and 1407. Or circuit 1404 produces a 1 when a smoothing pixel is needed to the right of the current pixel and this smoothing pixel. Or circuit 1407 produces a 1 when a smoothing pixel is need to the left of polo the current pixel. AND circuit 1402 generates smoothing pixel 1401 and AND circuit 1405 generates smoothing pixel 1408. The smoothing operation is enabled by AND gates 1403 and 1406 circuits.

Figure 15:
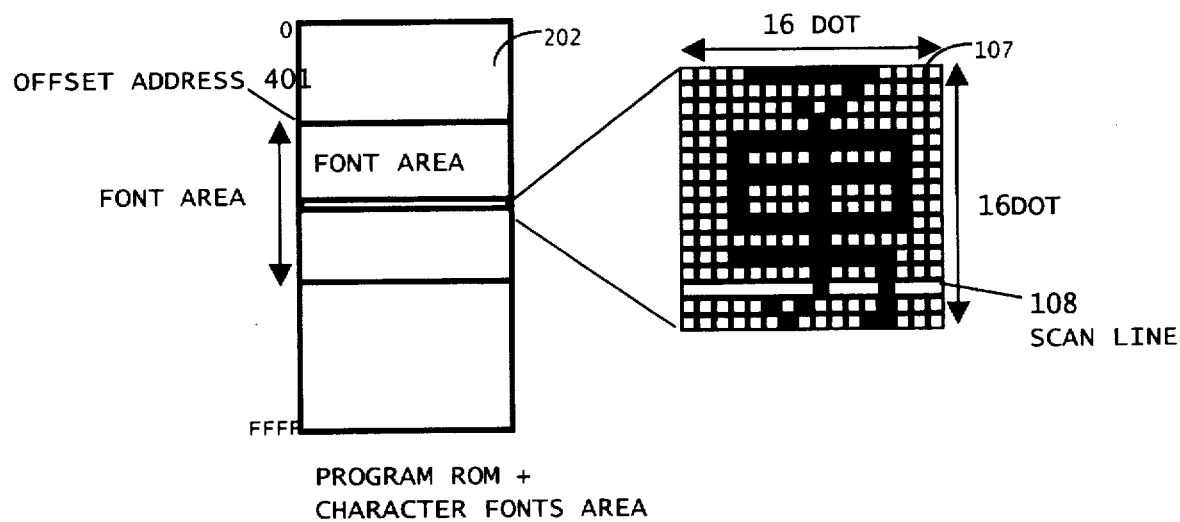
FIG. 15 illustrates the relationship between a character font in ROM and the font pattern.

FIG. 15 illustrates a relationship between character font in program ROM and the font pattern. The beginning address of font area (shaded in FIG. 15) can be adjusted by setting the proper offset address 401 in offset address register shown in FIG. 4. In the example shown in FIG. 15, the expanded font pattern is 16 pixels wide and 16 pixels high. The scan line refers to the current row in the font pattern. By defining multiple offset addresses, any font pattern exceeding the integral power of two (e.g. any bits over 16) can be defined in different area. In addition, the offset address can be used to define completely different kinds of data such as graphics icons and sprite cursor display stored in separate areas of memory.

Figure 16:
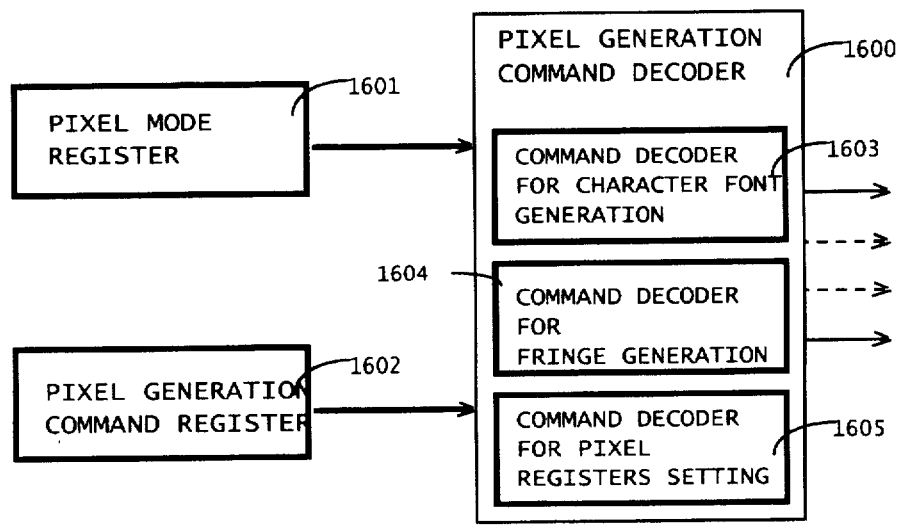
FIG. 16 is a block diagram of the pixel mode register, the pixel generation command register and the pixel generation command decoder.

FIG. 16 is a block diagram of the pixel mode register 1601, the pixel generation command register 1602 and the pixel generation command decoder 1600. Pixel mode register 1601 and pixel generation command register 1602 are decoded at pixel generation command decoder 1600 to produce pixel generation commands and control signals which are sent to font shifter/fringe generator 301, the pixel registers A and B 302, and the pixel memory banks A and B 206 and 207. Pixel generation decoder unit 1600 initiates three kinds of operations described below.

Character font generation 1603—create pixel data from character font data A and attribute data A and B.

Fringe generation 1604—generate fringe data from character font data A and B.

Pixel Register Setting 1605—store pixel data corresponding to the immediate value dat, font A data or font B data into the pixel registers.

These commands are executed in single cycle and the decoded signals control the pixel generation logic unit.

Figure 17A:
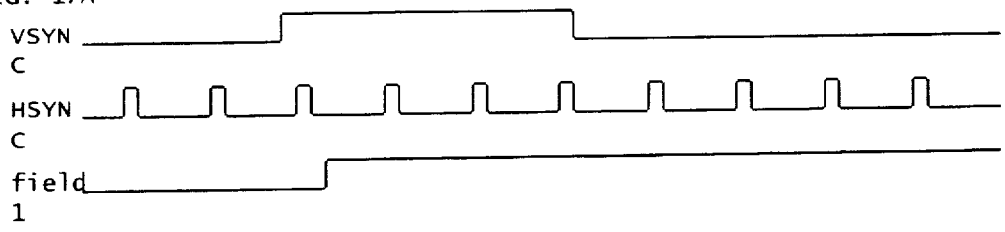
FIG. 17a illustrates the horizontal and vertical sync signals for field 1.
Figure 17B:
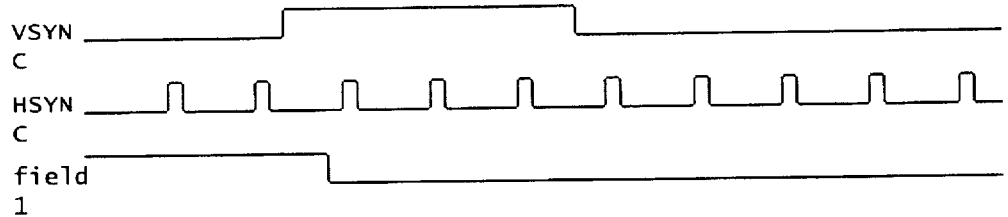
FIG. 17b illustrates the horizontal and vertical sync signals for field 2.
Figure 17C:
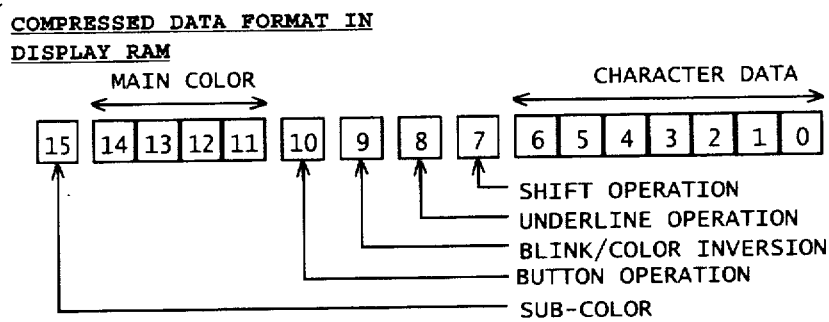
FIG. 17c illustrates the compressed display data format.
Figure 17D:
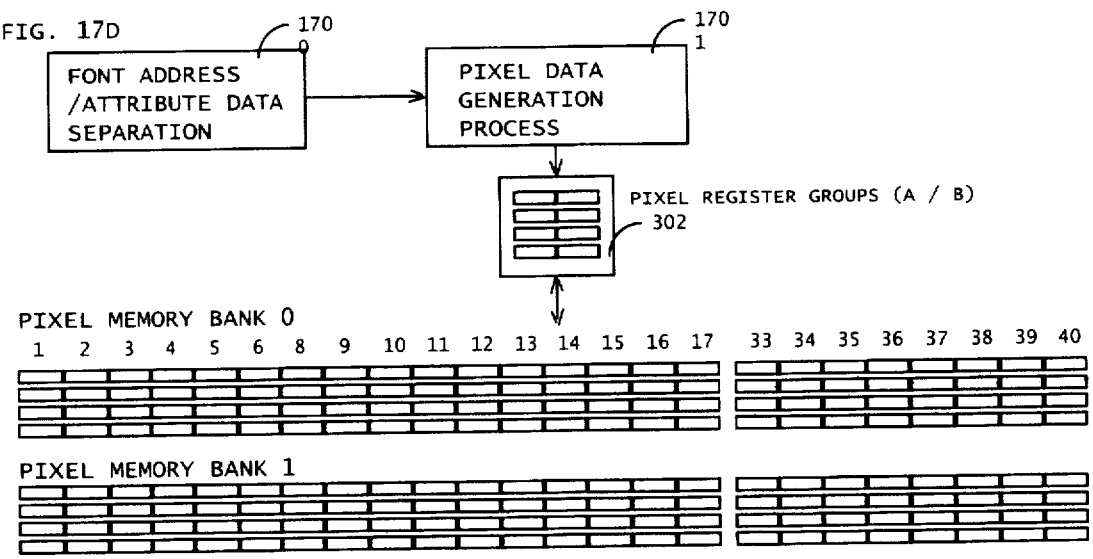
FIG. 17d is a block diagram of the pixel memories and associated circuitry.

FIG. 17*a* illustrates the VSYNC, HSYNC and field (odd field) 1 timing signals. FIG. 17*b* illustrates the VSYNC, HSYNC and field 2 (even field) timing signals. FIG. 17*c* illustrates the compressed display data format before expansion into the pixel registers. FIG. 17*d* is a block diagram of the flow of data through the system. The field 1 and field 2 are detected by the phase difference between VSYNC and HSYNC in the video signal. If the HSYNC signal is present one half cycle of the HSYNC period after the VSYNC is received, then the field is identified as field 1. Otherwise, the field is identified as field 2.

FIG. 17*c* illustrates an example of the character display format stored in the compressed display data area in RAM. Bit 15 is a sub-color and bits 14–11 are the four bits of main color. Either the sub-color or the main color can be assigned to the foreground or background in a character font. If the main color is assigned to the foreground, then the sub-color is assigned to the background and vise-versa. The four bits of main color provides the four bits of pixel data. The one bit of sub-color selects one of two pre-defined four bit pixel data stored in a sub-color register. Bit 10 is a button selection bit and creates a button color over the pixel register by forcing all the font data to one if the button selection bit is one. Bit 9 is used to identify either blink mode or bit inversion mode. If bit 9 is one, then either a blinking function of font A/B or an inverting function, where foreground and background colors are reversed, is implemented depending on the system configuration. The underline bit 8 ORs sixteen bits of pixel data having the foreground color over the character font data to create and underline. Bit 7 enables a shift-operation for creating an italic character display. If bit 7 is activated, the barrel-shifter shifts the font data to create an italic font. Bits 10–7 are either enabled or disabled by values stored in the pixel mode register 1601 so that the process timing is properly controlled by software. The remaining bits 6–0 are used as character data. It is understood that bits 6–0 may define characters, icons, graphics, etc. Accordingly, the term "character" is intended to encompass alphanumeric characters, icons, cursors, graphics and any other patterns that may be displayed. If the number of defined characters exceeds 128, (e.g. 1024 characters are necessary), the compressed data format can be two split into two words of data, one for the character data and the other for the attribute data. Of course, unnecessary attributes may be eliminated to free additional bits for defining additional character.

FIG. 17*d* is a block diagram illustrating the process of converting compressed font data to pixel data. The font address/attribute data separation circuit generates the font address and the attribute data. The pixel data generation process 1701 converts the character font to 16 bit by 4 bit pixel data arrays and the result is written to pixel register groups A or B. Finally, the content of the pixel registers is stored into either pixel memory bank 0 or bank 1 at the proper timing. By reading pixel data back into the pixel registers and applying the pixel overlay process, the complex (e.g. multi layer) on-screen display is carried out.

Figure 18:
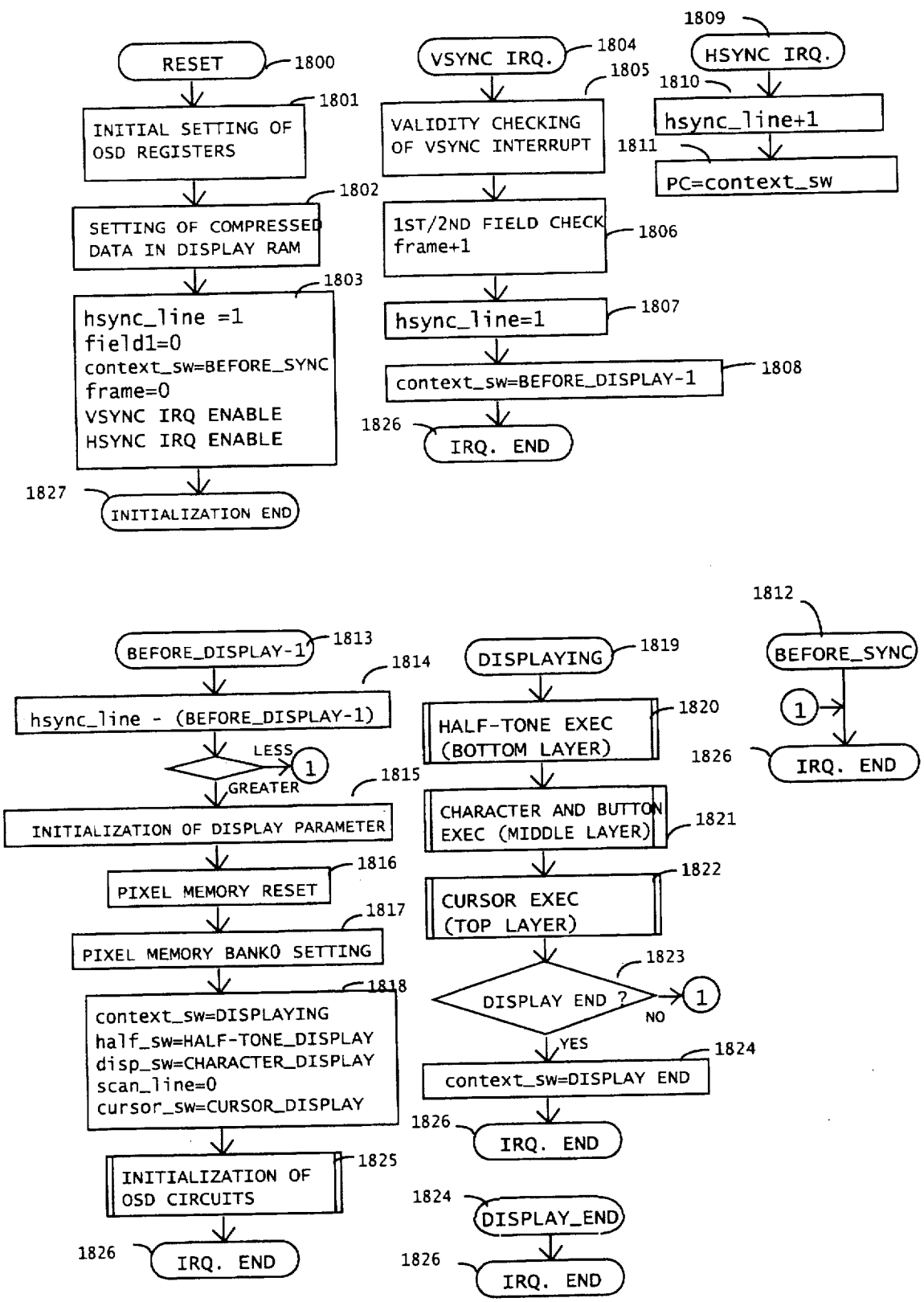
FIG. 18 is a flowchart of a multi-layer display operation.

FIG. 18 is a flowchart of the multi-layer display process. The process begins at step 1800 after the CPU is reset. The OSD hardware registers are initialized at 1801 and the proper display data from the first layer to third layer is loaded to the compressed display RAM area at 1802. Then at step 1803, the context switch and working RAMs are initialized as follows.

hsync_line=1, field1=0, frame=0, context_sw=BEFORE_SYNC

After the VSYNC and HSYNC interrupts are enabled, the initialization completes.

When a VSYNC interrupt is detected at step 1804, the validity of interrupt is first checked at 1805. If value of hsync_line is too small, indicating that the end of the screen has not been reached, the VSYNC interrupt is ignored to maintain software service dependent upon the VSYNC and HSYNC signals. The system eliminates noisy V sync pulses and raises the noise immunity to provide enough time for the background job. If the VSYNC interrupt is valid, the field 1/field 2 detection and frame are revised at step 1800. In addition, the hsync_line=1 and context_sw=BEFORE_DISPLAY−1 are set at steps 1807 and 1808.

When an HSYNC interrupt occurs, hsync_line is automatically incremented at 1810 and context_sw value is loaded into the program counter to provide the branching address for the various display routines. If the context_sw is equal to BEFORE_SYNC, then the process is immediately over as shown at steps 1812 and 1826. If context_sw is BEFORE_DISPLAY−1, flow proceeds to step 1813. At step 1814, hsync_line is compared to BEFORE_DISPLAY−1. If hsync_line is less than BEFORE_DISPLAY−1, then the process is over and flow proceeds to step 1826. If hsync_line is equal to or and greater than BEFORE_DISPLAY−1, then the working parameters in RAM for display are initialized at step 1815. The two banks of pixel memory are reset at step 1816 and pixel memory bank 0 is selected at step 1817. At step 1818, the following data are initialized.

context_sw=DISPLAYING half_sw=HALF-TONE_DISPLAY disp_sw=CHARACTER_DISPLAY scan_line=0 cursor_sw=CURSOR_DISPLAY.

At step 1825, the OSD display registers such as display start position, maximum display column, display start bit position, maximum display column and double scan mode are initialized.

In display mode, commencing at step 1819, pixel display data is generated and overlaid subsequently from the first layer at step 1820, the second layer at step 1821 and the third layer at step 1822 in order. When the display process is over, the DISPLAY_END value is loaded to context_sw at step 1824. The HSYNC interrupt service routine immediately ends the process upon BEFORE_SYNC or DISPLAY_END status.

FIG. 19 illustrates three different types of display formats. Format 1901 is the bottom layer display having a half-tone format. The half-tone format includes a half-tone control word defining the number of half-tone regions, the start position (X, Y) and the end position (X, Y). The middle layer display format 1902 consists of character and button data. The data contains a) page control word including the number of display rows and display start position; b) row control word including the number of display columns, display size and display start column; c) attribute and character data; d) button control word including a button start position, end position and depress/raise button option. The third display format is the cursor data format 1903 displayed on the top layer. The cursor control word includes cursor font, width and length. The cursor start position specifies the vertical and horizontal position of the cursor. Other display formats, which are designated by the user through software, may be used for different display patterns.

Figure 20:
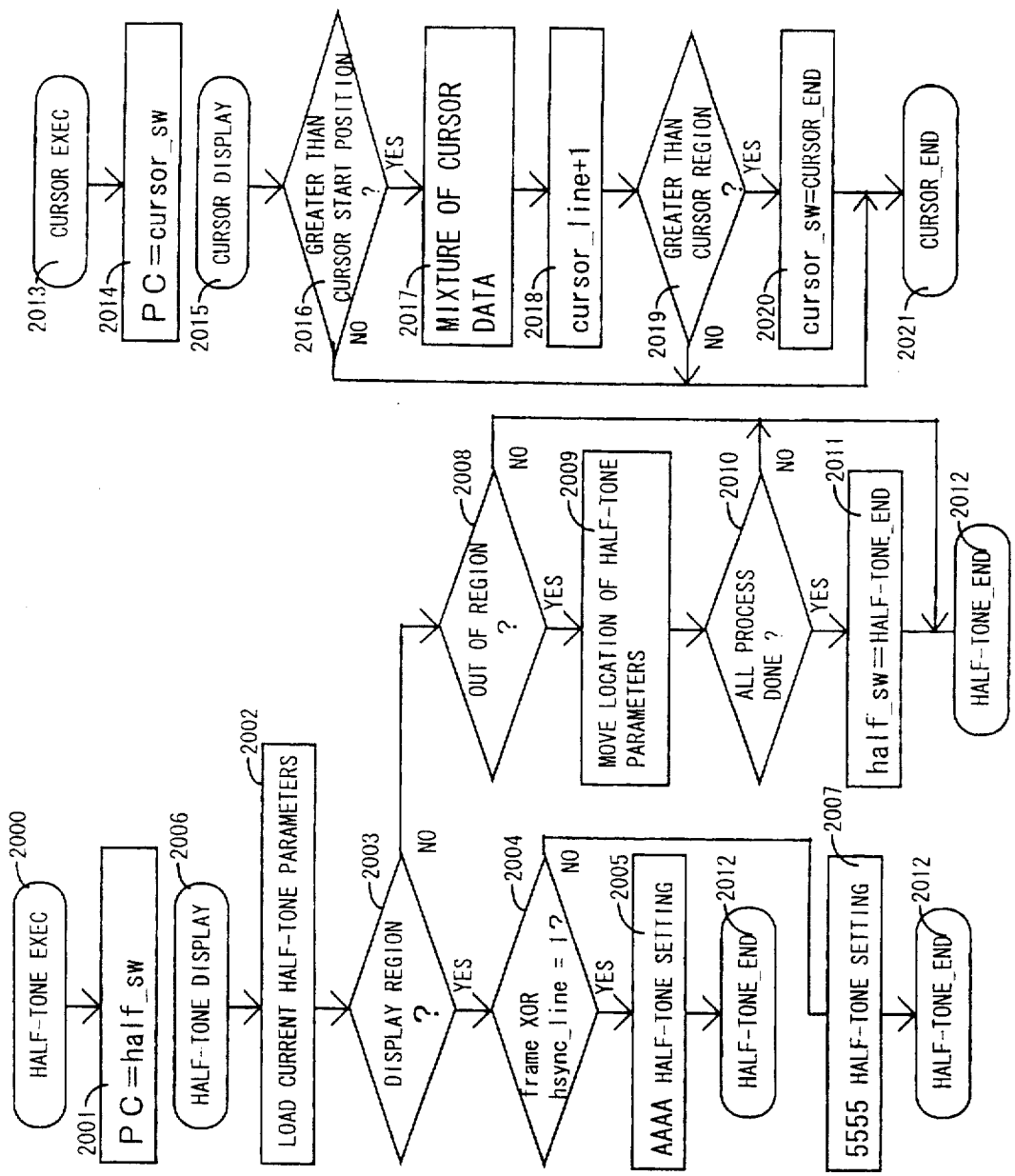
FIG. 20 is a flowchart of half-tone and cursor display.

FIG. 20 is a flow chart of half-tone display and cursor display. The half-tone display begins at step 2000 and proceeds to step 2001 where the program counter value is set equal to half_sw. Then the current half-tone parameters are loaded at step 2002 and if it is in the region of cursor display, flow proceeds to step 2004. At step 2004, the exclusive-OR operation (XOR) is performed between the frame value and the hsync_line value. If the result of the XOR is "1", the process stores an AAAA hex pattern of transparent and black color data into pixel memory. Otherwise, the process stores a 5555 hex pattern of transparent and black color data into the memory. This establishes a black and white mesh pattern at every horizontal period and also compensates for the phase of each frame. If the half-tone region is not within the cursor display region, step 2003 leads to step 2008 which detects whether current half-tone region has been exited. If not, the process ends. If at step 2008, the current position exceeds the current half-tone region, the process flows to the next half-tone region defined by the start and end positions for the next half-tone region in data 1901. If all half-tone regions have been processed, half_sw is set to HALF_TONE_END and the process is completed.

Figure 21:
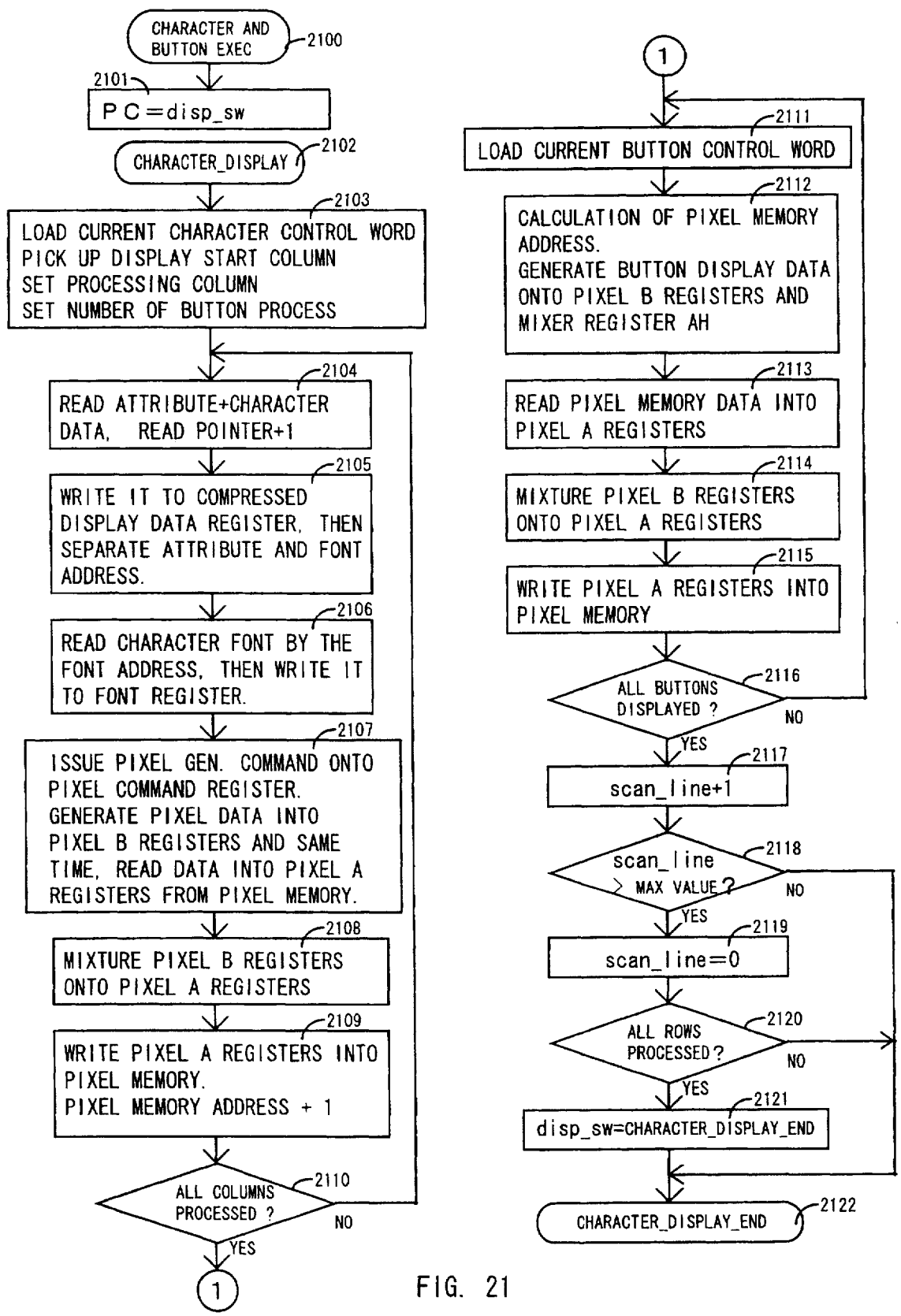
FIG. 21 is a flowchart of character and button display.

FIG. 21 is a flow chart of the character display process along with button display. The second layer of character font display 2100 starts by setting the program counter to disp_sw and proceeding to step 2102. The current character control word is loaded at step 2103 and the display start column, the maximum size of display column and the number of buttons display are set to the designated working RAMs. The character and attribute data are converted to pixel data through steps 2104 to 2110. The character and attribute data are read and the reading pointer is incremented at step 2104. The read data is written to the compressed display data register and the attribute and font address are separated in single cycle at step 2105. The character font is read from program ROM by using the separated font address and is transferred to font register A at step 2106. The pixel generation command is issued at step 2107, and the pixel data is stored to pixel register B while at the same time the pixel memory previously generated is read back to pixel register A. The two pixel registers are overlaid at step 2108 and the result of pixel register A is written to the pixel memory. At step 2109, the pixel memory address is incremented. When all the columns have been processed, flow proceeds to step 2111.

The button display is processed through steps 2111 to 2116. The current button control word is loaded at step 2111 and the designated pixel memory address is calculated at step 2112. The button display data is generated to pixel register B and mixer register AH. The pixel memory data is read to pixel register A at step 2113 and is overlaid by the pixel register B at step 2114. The result is written back to the pixel memory at step 2115. Step 2116 checks whether all the buttons have been displayed.

After the button display process is completed, scan_line is incremented at step 2117 and if it exceeds the maximum scan line value, scan_line is initialized to 0. When all rows of character display are done, disp_sw is set to CHARACTER_DISPLAY_END and the character display process is completed.

The final layer of display data is the cursor display shown in steps 2013–2021 of FIG. 20. The cursor display routine begins at step 2013 and flows to step 2014 where the program counter is set to cursor_sw. The cursor position in the third layer of display is tested at step 2016. The cursor pixel data is overlaid into the pixel memory at step 2017 and the cursor_line value is incremented at step 2018. When the display process exceeds the maximum cursor line at step 2019, then CURSOR_END value is loaded into cursor_sw of context switch RAM, indicating the end of cursor process.

If the picture resolution is enhanced by increasing the scan line frequency by n-times, the on-screen display system may be used to generate the same on-screen display data over n lines. The sync pulse interrupt will occur once every n-lines as opposed to every line. In addition, the zero data output circuit 723 will not clear the pixel memory until the last of n-lines has been displayed.

The present invention provides for complex OSD without requiring a large array of memory. The system uses a pixel memory having a maximum capacity of two horizontal lines of display data. This reduction is the amount memory substantially reduces the cost of the system.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An on-screen display system for use with a display, the system comprising:
   a memory for storing compressed display data;
   pixel generator for generating pixel data based on the compressed display data;
   pixel memory coupled to said pixel generator for receiving said pixel data, said pixel memory having a capacity to store pixel data for a predetermined number of horizontal scan lines, said pixel memory including a first pixel memory and a second pixel memory, wherein said pixel memory has a maximum capacity to store pixel data for two horizontal scan lines; and
   on-screen display device for receiving pixel data from said pixel memory and generating display signals for displaying said pixel data on the display
   wherein the on-screen display device alternately
      retrieves the contents of said first pixel memory while said second pixel memory receives pixel data from said pixel generator; and
      retrieves the contents of said second pixel memory while said first pixel memory receives pixel data from said pixel generator;
   said on-screen display device alternating between said first pixel memory and said second pixel memory in response to a horizontal sync signal.

2. The on-screen display system of claim 1 wherein said compressed display data includes a display data address and attribute data and said on-screen display system further comprises a separator which retrieves the compressed display data from said memory, separates the display data address from said attribute data and provides the separated display data address and attribute data to said pixel generator.

3. The on-screen display system of claim 2 further comprising a display memory for storing display data, said separator comprising:
   an offset address register for storing an offset address;
   an address manipulator for performing an arithmetic operation between the offset address to the display data address; and
   a font address register for storing the sum of the display data address and the offset address to identify an address in the display memory.

4. The on-screen display system of claim 3 further comprising an access mode register which stores a value for instructing said address manipulator to perform one of addition and subtraction.

5. The on-screen display system of claim 2 further comprising a first attribute register for storing current attribute data and a second attribute register for storing previous attribute data.

6. The on-screen display system of claim 4 wherein said access mode register further stores a value indicating the maximum display data height.

7. The on-screen display system of claim 1 further comprising:
   a first pixel register for storing pixel data generated by said pixel generator and coupled to said pixel generator and said pixel memory; and
   a second pixel register for storing pixel data generated by said pixel generator and coupled to said pixel generator and said pixel memory.

8. The on-screen display system of claim 7 wherein the contents of said second pixel register and said first pixel register are mixed to create mixed pixel data and the mixed pixel data is stored in said first pixel register.

9. The on-screen display system of claim 8 wherein multiple layers of pixel data are mixed during a horizontal scan line.

10. The on-screen display system of claim 8 further comprising a mixer register for controlling the mixing of the contents of said first pixel register and said second pixel register.

11. The on-screen display system of claim 2 wherein said attribute data includes a bit for designating a blink operation.

12. The on-screen display system of claim 2 wherein said attribute data includes a bit for designating an underline operation.

13. The on-screen display system of claim 2 wherein said pixel generator retrieves display data from a display memory based on said display data address and further comprises a fringe generator for generating fringe pixels based on the display data.

14. The on-screen display system of claim 2 further comprising a half-tone generator for producing of half-tone pixel data.

15. The on-screen display system of claim 14 wherein said half-tone pixel data comprises pixel data alternatively having a no display value and a color value.

16. The on-screen display system of claim 2 wherein said pixel generator retrieves display data from a display memory based on said display data address and further comprises a smoother for smoothing the display data.

17. The on-screen display system of claim 16 wherein said smoother doubles the size of the display data.

18. The on-screen display system of claim 7 further comprising a data transfer device for transferring pixel data between said first and second pixel registers and said pixel memory in a single clock cycle.

19. The on-screen display system of claim 1 further comprising a zero data output device for clearing the contents of said pixel memory data after transfer of said pixel data from said pixel memory to said on-screen display device.

20. The on-screen display system of claim 19 wherein said zero data output device clears the contents of said pixel memory data after n lines of pixel data are displayed.

21. The on-screen display system of claim 1 wherein said on-screen display device receives pixel data from said pixel memory once every n scan lines.

22. The on-screen display system of claim 5 wherein the pixel generator copies the contents of the first attribute register to the second attribute register.

23. The on-screen display system of claim 1 wherein said on-screen display device defines an on-screen display area by storing a display start position and a display start bit.

24. The on-screen display system of claim 7 wherein said pixel memory comprises a first pixel memory and a second pixel memory, wherein the on-screen display unit alternately, retrieves the contents of said first pixel memory as the contents of the first pixel register are stored in said second pixel memory; and retrieves the contents of said second pixel memory as the contents of the first pixel register are stored in said first pixel memory.

25. The on-screen display system of claim 2 wherein said attribute data includes a main color identifier for instructing the on-screen display circuitry to prevent display of said pixel data.

26. The on-screen display system of claim 2 wherein said attribute data includes a main color identifier and a subcolor identifier, the main color identifier corresponding to a foreground color and the subcolor identifier corresponding to a background color.

27. The on-screen display system of claim 1 wherein said compressed display data is stored in a plurality of formats.

* * * * *